(12) United States Patent
Yamawaki

(10) Patent No.: US 6,317,979 B1
(45) Date of Patent: Nov. 20, 2001

(54) METHOD OF MANUFACTURING A HOLLOW RACK BAR

(75) Inventor: Takashi Yamawaki, Kasugai (JP)

(73) Assignees: TRW Automotive Japan Co. LTD; Toyota Jidosha Kabushiki Kaisha, both of Aichi-Ken (JP)

(*) Notice: Subject to any disclaimer, the term of this patent is extended or adjusted under 35 U.S.C. 154(b) by 0 days.

(21) Appl. No.: 09/479,474

(22) Filed: Jan. 10, 2000

(30) Foreign Application Priority Data

Jan. 11, 1999 (JP) .................................................. 11-004379

(51) Int. Cl.[7] .............................. B23P 15/14; B21C 25/02
(52) U.S. Cl. ..................... 29/893.34; 72/370.04; 72/398
(58) Field of Search .............................. 29/893.3, 893.34; 72/398, 471, 370.04, 352, 356

(56) References Cited

U.S. PATENT DOCUMENTS

| | | |
|---|---|---|
| 1,983,584 | 12/1934 | Urschel . |
| 3,670,555 | 6/1972 | Fredericks . |
| 4,598,451 | * 7/1986 | Ohki ..................................... 29/893.3 |

FOREIGN PATENT DOCUMENTS

| | | |
|---|---|---|
| 137335 | 11/1989 | (JP) . |
| 35892 | 1/1991 | (JP) . |

* cited by examiner

*Primary Examiner*—P. W. Echols
(74) *Attorney, Agent, or Firm*—Tarolli, Sundheim, Covell, Tummino & Szabo L.L.P.

(57) ABSTRACT

A manufacturing method of a hollow rack bar wherein the load imposed on the rack teeth configuration of a forming die is reduced and precision level of the formation of rack teeth is improved. After the formation of a flat portion, a steel pipe is placed in the forming die having a rack-teeth configuration and a plurality of mandrels having extruding portions of different sizes are sequentially inserted into the steel pipe in order to form rack teeth. A mandrel having a planar extruding portion is firstly inserted and then a mandrel having an extruding portion with an approximately central depression in the longitudinal direction is inserted. The width of the mandrels is smaller than the inside diameter of the steel pipe.

6 Claims, 4 Drawing Sheets

METHOD OF MANUFACTURING A HOLLOW RACK BAR

FIELD OF THE INVENTION

The present invention relates to a method of manufacturing a hollow rack bar, wherein a flat portion is formed in a steel pipe and rack teeth are formed in the flat portion.

BACKGROUND OF THE INVENTION

In a conventional rack-and-pinion steering system for motor vehicles and the like, a rack bar has been employed. Recently, it has been tried to hollow the rack bar so as to make it more lightweight. In a method of manufacturing such a hollow rack bar, as disclosed in Publication of Examined Japanese Patent Application No. Hei 3-5892, an electric resistance welded tube or an extrusion molded steel pipe is employed and a flat portion is formed in the periphery of the tube or the steel pipe by press working. In the flat portion are formed rack teeth by placing the steel pipe having the flat portion in a tooth profile forming die-and forcibly inserting a mandrel into the steel pipe, thereby extruding the flat portion from the inside.

However, such a conventional method has a problem that the rack teeth configuration of the tooth profile forming die, particularly the central portion of the rack teeth configuration, is continuously subjected to an excessive load. Also, transverse end portions of the rack teeth cannot be formed precisely. Furthermore, resistance by processing imposed on the mandrel is significant.

SUMMARY OF THE INVENTION

Wherefore, an object of the present invention is to provide a manufacturing method of a hollow rack bar wherein the load imposed on the rack teeth configuration of a tooth profile forming die is reduced and precision level of the formation of rack teeth is improved.

This and other objects of the invention are achieved in a manufacturing method of a hollow rack bar by flattening a steel pipe to form a flat portion and forming rack teeth in the flat portion, wherein, subsequent to the formation of the flat portion, the rack teeth are formed by placing the steel pipe in a tooth profile forming die having rack teeth configuration and sequentially inserting a plurality of mandrels having extruding portions of different sizes into the steel pipe, thereby extruding the flat portion from the inside thereof toward the rack teeth configuration. In the method, a mandrel having a planar extruding portion is firstly inserted, and then a mandrel having an extruding portion with an approximately central depression in the longitudinal direction is inserted.

Since the mandrel having an extruding portion with an approximately central depression in the longitudinal direction is inserted for extrusion toward the rack teeth configuration, the load imposed on the rack teeth configuration is reduced and also the resistance by processing imposed on the mandrel is reduced.

In another aspect of the invention, there is provided a hollow rack bar manufacturing apparatus which comprises pressing means for forming a steel pipe having a flat portion, placing means for placing the steel pipe having a flat portion formed by the pressing means in a forming die having a rack teeth configuration, and inserting means for inserting at least one mandrel having an extruding portion with an approximately central depression into the steel pipe placed in the forming die.

In further aspect of the invention, there is provided a mandrel for manufacturing a hollow rack bar by forming rack teeth in a flat portion formed in a steel pipe by flattening, the mandrel comprising an extruding portion to be inserted into the steel pipe placed in a forming die having a rack teeth configuration and an approximately central depression formed in the extruding portion.

BRIEF DESCRIPTION OF THE DRAWINGS

The invention will now be described, by way of example, with reference to the accompanying drawings, in which.

DETAILED DESCRIPTION THE PREFERRED EMBODIMENT

Figure 3:
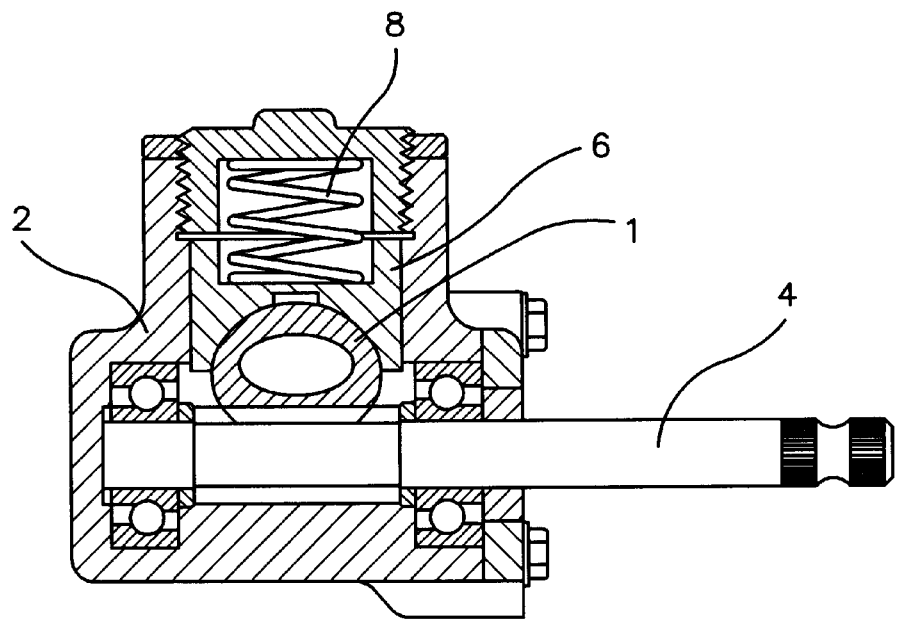
FIG. 3 is a cross sectional view of the main part of a steering mechanism using a hollow rack bar.
Figure 4:
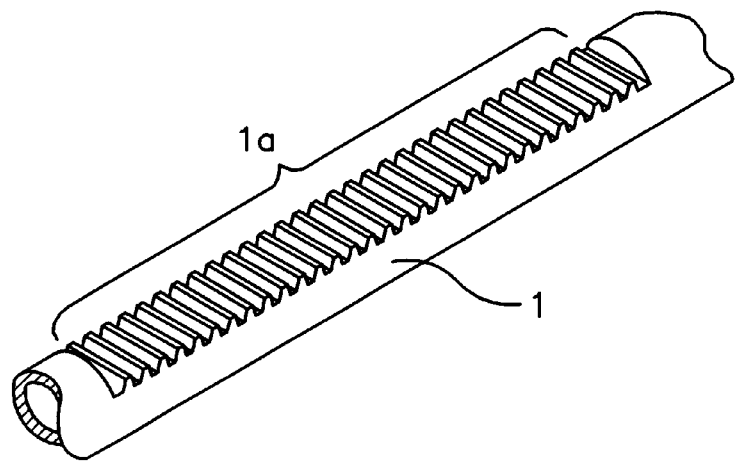
FIG. 4 is a perspective view of rack teeth of a hollow rack bar.
Figure 5:
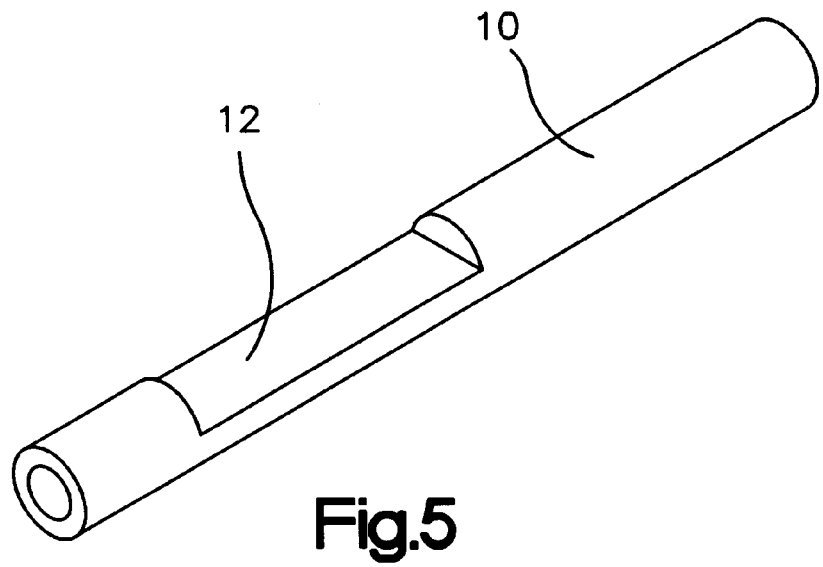
FIG. 5 is a perspective view of a steel pipe with a flat portion formed.
Figure 6:
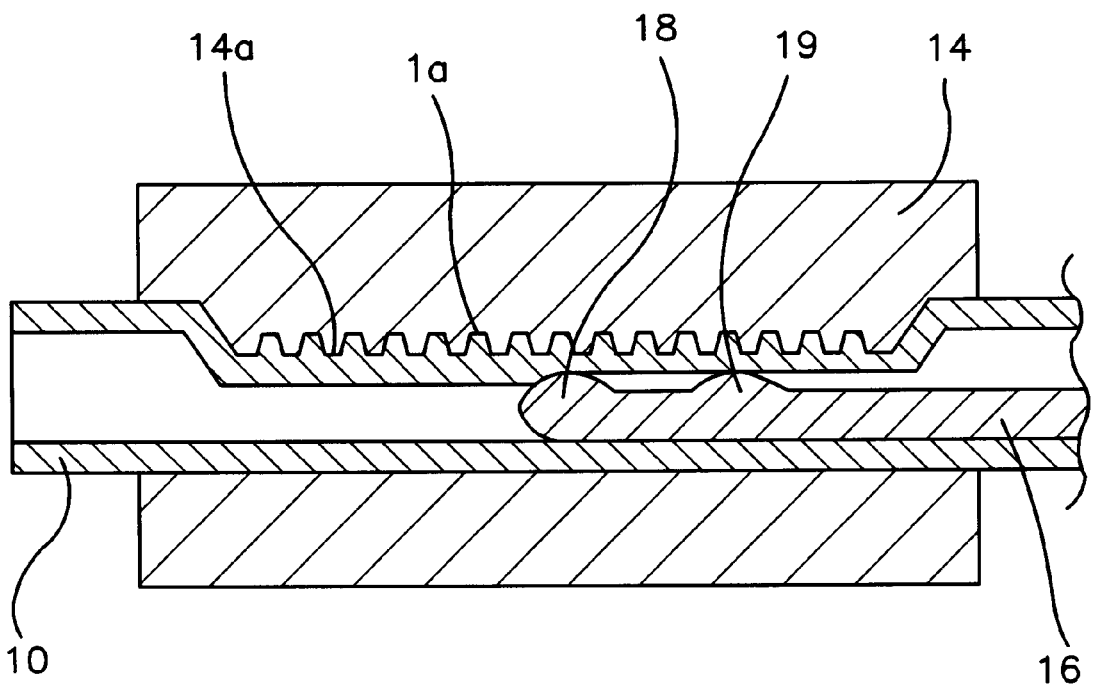
FIG. 6 is a longitudinal sectional view showing how the rack teeth are formed according to the manufacturing method of a hollow rack bar in the embodiment.

As shown in FIG. 3, a hollow rack bar 1 is engaged with a pinion 4 rotatably held in a gear housing 2. The rack bar 1, as shown in FIG. 4, is provided with rack teeth 1a formed in the periphery thereof and engaged with the pinion 4. On the opposite side of the rack bar 1 to the pinion 4 is pressed a rack guide 6 by means of the biasing force of a spring 8, which adjusts the engagement of the rack bar 1 with the pinion 4 by pushing the rack bar 1 toward the pinion 4.

For manufacturing the hollow rack bar 1, a steel pipe such as an electric resistance welded tube or an extrusion molded steel pipe is employed as a blank, and firstly a flat portion 12 is formed in the periphery of the steel pipe 10 by means of cold flattening and the like. After formation of the flat portion 12, the steel pipe 10 is placed in a forming die 14 having rack teeth configuration 14a, and a mandrel 16 is forcibly inserted into the steel pipe 10. Then, rack teeth 1a are formed by pressing two extruding portions 18, 19 provided to the mandrel 16 against the inner surface of the flat portion 12, extruding the flat portion 12 from the inside thereof toward the rack teeth configuration 14a and causing a material flow.

Figure 2A:
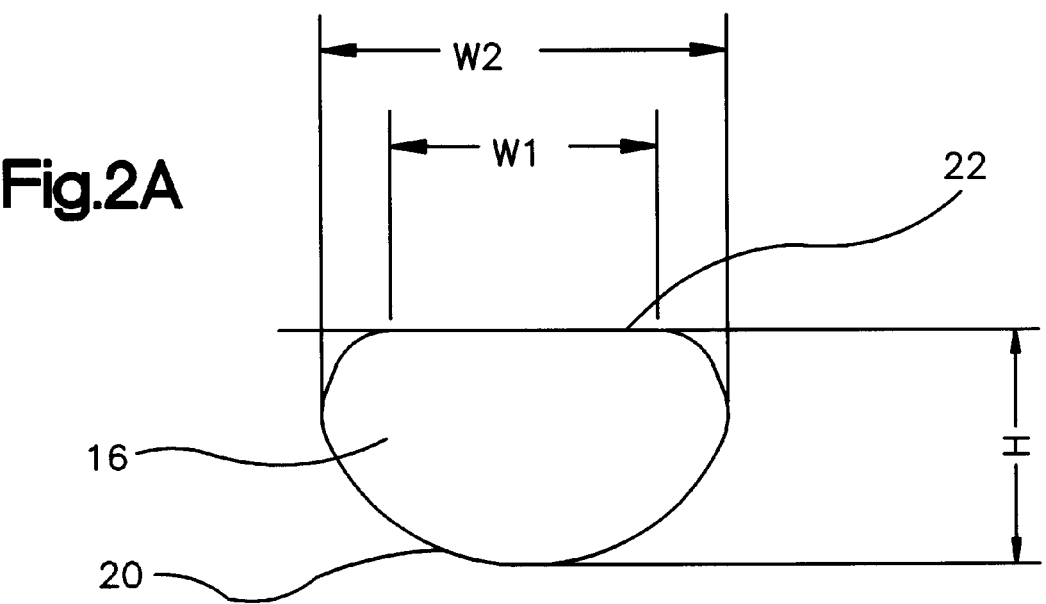
FIGS. 2A and 2B are cross sectional views of mandrels used in the manufacturing method of a hollow rack bar according to the preferred embodiment.
Figure 2B:
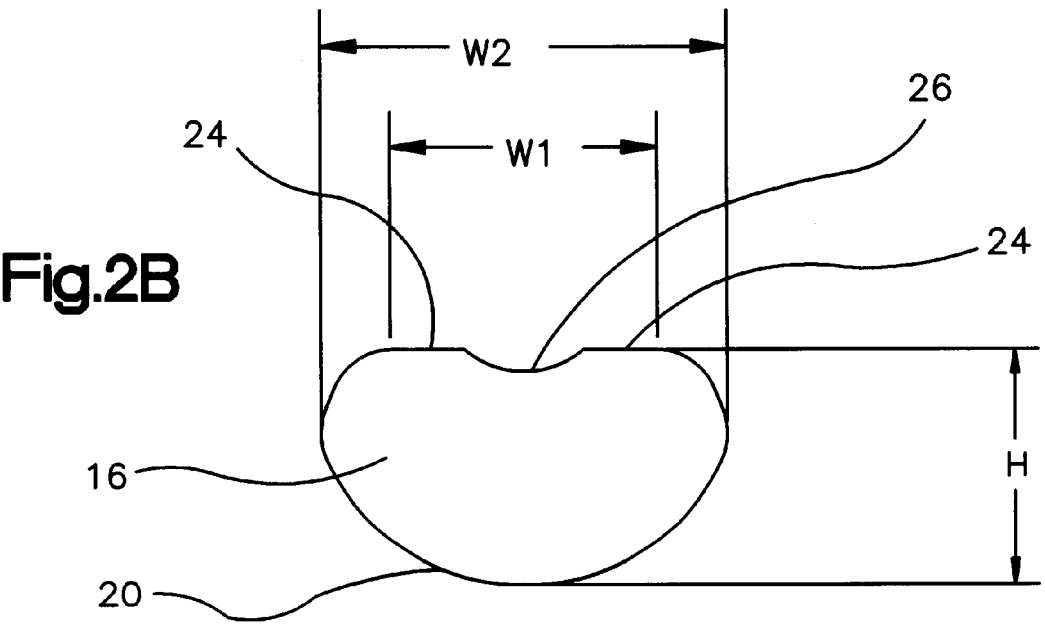

In this case, the backward extruding portion 19 is a little larger than the extruding portion 18 at the forward end. Also, a plurality of mandrels 16 having the extruding portions 18, 19 of different sizes are sequentially inserted into the steel pipe 10, and thereby the flat portion 12 is gradually extruded to form the rack teeth 1a. This process is now described with respect to the extruding portion 18 with reference to FIGS. 2A and 2B. The sectional configuration perpendicular to the axial direction of the extruding portion 18 is as shown in FIG. 2A. That is, there are provided an arcuate portion 20 designed to contact with an arcuate portion 13 of the steel pipe 10 and a planar portion 22 designed to contact the inner surface of the flat portion 12 when the mandrel 16 is inserted into the steel pipe 10.

The width W1 of the planar portion 22 is smaller than the width W2 of the extruding portion 18, which is smaller than the inside width W3 of the steel pipe 10. When the mandrel 16 is inserted into the steel pipe 10, gaps g occur between the mandrel 16 and the inner surface of the steel pipe 10 around both transverse edges of the mandrel 16. In the present embodiment, the width W1 and the width W2 of the mandrel 16 are common with respect to all of a plurality of mandrels 16.

In contrast, the height H of the extruding portion 18 of each of the mandrels 16 is designed to increase little by little in accordance with the order of insertion. The rate of increase is designed to be reduced as the processing goes ahead into the finishing process. Among the plurality of mandrels 16, mandrels 16 used in the latter part of the processing are, as shown in IG. 2B, provided with an approximately central depression 26 whose approximate center is the most depressed and planar portions 24 located across the depression 26.

When the rack teeth 1a are formed using the plurality of mandrels 16, the steel pipe 10 with the flat portion 12 formed therein is firstly placed in the forming die 14 having rack teeth configuration 14a. Then, the mandrel 16 having the planar portion 22 is forcibly inserted into the steel pipe 10.

Figure 1A:
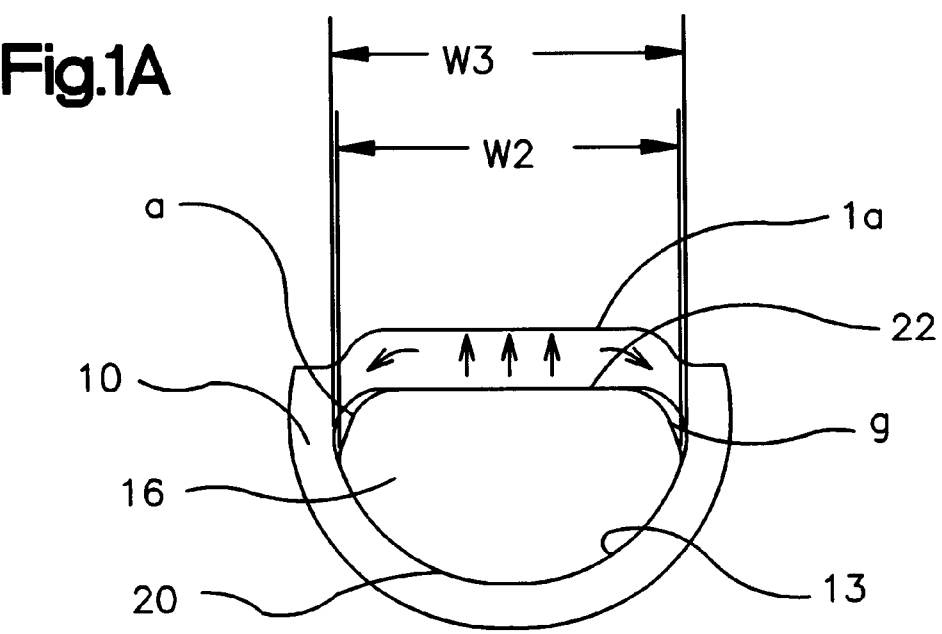
FIGS. 1A and 1B are explanatory views showing processing in a manufacturing method of a hollow rack bar according to a preferred embodiment of the present invention.

By this, as shown in FIG. 1A, the arcuate portion 20 contacts with the arcuate portion 13 of the steel pipe 10, and the planar portion 22 contacts with the inner surface of the flat portion 12, which results in extrusion of the flat portion 12 toward the rack teeth configuration 14a. As indicated by arrows in FIG. 1A, the material is extruded outwardly in the radial direction around the center, but the material flows toward both sides around both ends of the planar portion 22 and therefore is extruded to form round corners. The flat portion 12 is further extruded toward the rack teeth configuration 14a by means of the plurality of mandrels 16 having different heights H.

Figure 1B:
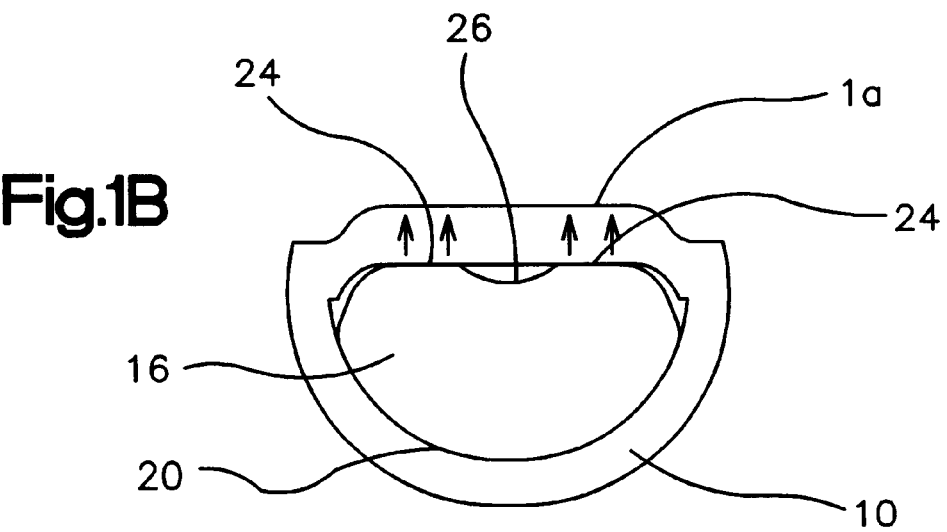

In the latter part of the processing, the mandrel 16 with a depression 26 formed therein is inserted to further extrude the flat portion 12 toward the rack teeth configuration 14a. In this case, as indicated by arrows in FIG. 1B, the material is extruded by the planar portions 24 located across the depression 26, and therefore each of the rack teeth is formed to have square corners at both ends. Precision of the formation of the rack teeth is thus improved and an effective width of the rack teeth 1a becomes large.

Moreover, especially in the latter part of the processing, although a heavy load is imposed on the rack teeth configuration 14a because the extruded flat portion 12 is pressed thereon, the load can be reduced by providing the depression 26. Specifically, since the load is only by the planar portions 24 across the depression 26, the load on the rack teeth configuration 14a as well as the resistance by processing imposed on the mandrel 16 can be reduced. Further, the gaps g around both transverse ends of the mandrel 16 enable the resistance by processing to be reduced and improve the endurance of the mandrel 16.

The invention is not limited to the above described embodiment and may be embodied in various forms without departing from the spirit and the scope of the invention.

What is claimed is:

1. A method of manufacturing a hollow rack bar comprising the steps of flattening a steel pipe to form a flat portion and forming rack teeth in said flat portion, wherein subsequent to the formation of said flat portion, said rack teeth are formed by placing said steel pipe in a forming die having a rack teeth configuration and inserting a mandrel having an extruding portion into said steel pipe, thereby extruding said flat portion from the inside thereof toward said rack teeth configuration by said extruding portion, said manufacturing method comprising the step of:
    inserting said mandrel having said extruding portion with an approximately central and longitudinal depression.

2. The manufacturing method of a hollow rack bar according to claim 1, wherein a plurality of mandrels having different configurations of said extruding portion are sequentially inserted.

3. The method of manufacturing a hollow rack bar according to claim 2, wherein said rack teeth are formed by firstly inserting said mandrel having said extruding portion with a planar portion and secondly inserting said mandrel having said extruding portion with planar portions and an approximately central and longitudinal depression therebetween.

4. The manufacturing method of a hollow rack bar according to claim 1, wherein said rack teeth are formed by inserting said mandrel having a smaller width than the inside diameter of said steel pipe.

5. The manufacturing method of a hollow rack bar according to claim 1, wherein said mandrel has more than one of said extruding portions.

6. A mandrel for manufacturing a hollow rack bar by forming rack teeth in a flat portion formed in a steel pipe by flattening, said mandrel comprising:

an extruding portion to be inserted into said steel pipe placed in a forming die having a rack teeth configuration; and an approximately central depression formed in said extruding portion, wherein the load imposed on said rack teeth configuration and the resistance by processing imposed on said mandrel are reduced in comparison to a mandrel without an approximately central depression formed in the extruding portion.

\* \* \* \* \*